N. H. BRUCE.
Fruit-Gatherer.
No {1,969, 32,973.}  Patented Aug. 6, 1861
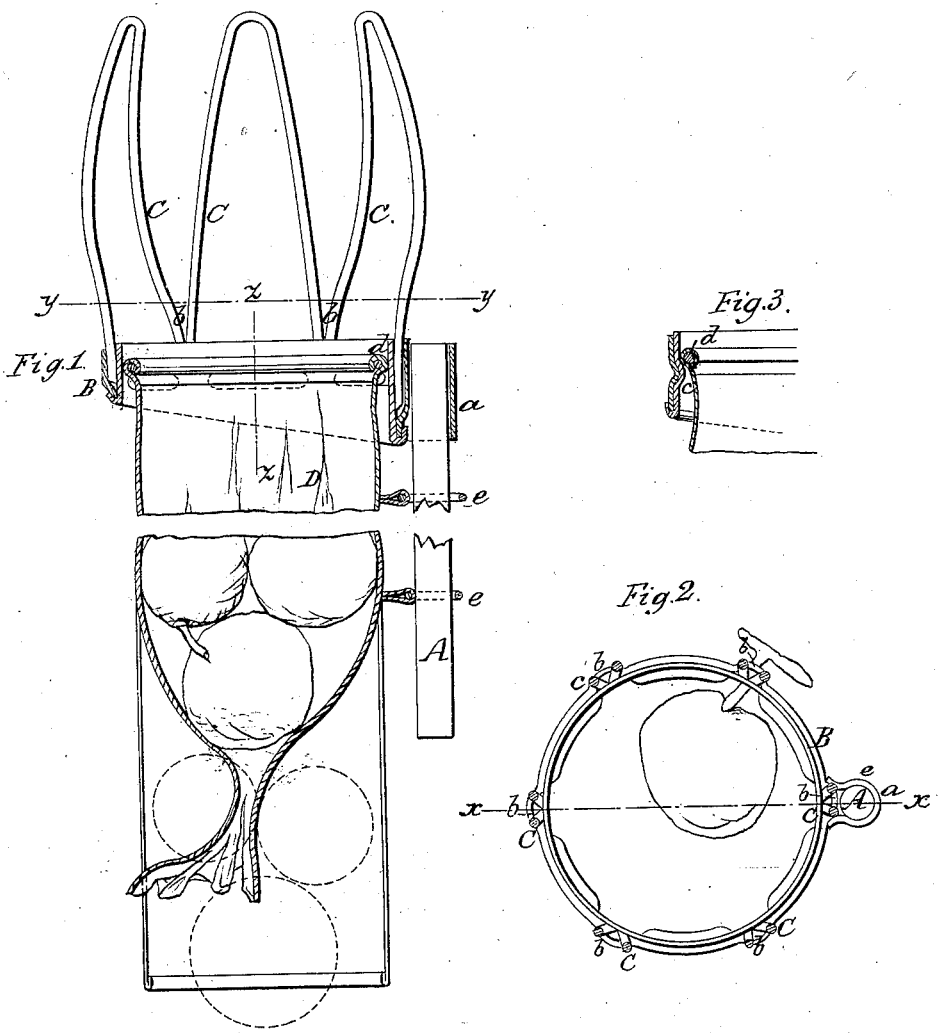
Witnesses
J. W. Coombs.
Wm Tusch.
Inventor.
N. H. Bruce.
per Munn & Co
Attys.

UNITED STATES PATENT OFFICE.

NORMAN H. BRUCE, OF SHIRLEY, MASSACHUSETTS.

IMPROVEMENT IN FRUIT-GATHERERS.

Specification forming part of Letters Patent No. 32,973, dated August 6, 1861.

*To all whom it may concern:*

Be it known that I, NORMAN H. BRUCE, of Shirley, in the county of Middlesex and State of Massachusetts, have invented a new and Improved Fruit-Gatherer; and I do hereby declare that the following is a full, clear, and exact description of the same, reference being had to the annexed drawings, making a part of this specification, in which—

Figure 1 is a longitudinal central section of my invention, $xx$, Fig. 2, indicating the plane of section; Fig. 2, a transverse section of same, taken in the line $yy$, Fig. 1; Fig. 3, a section of a portion of same, taken in the line $zz$, Fig. 1.

Similar letters of reference indicate corresponding parts in the several figures.

The object of this invention is to obtain a simple, cheap, and efficient device by which apples and similar fruit may, without a ladder, be plucked from the tree and deposited in a basket or other suitable receptacle without being bruised or injured in any way.

The invention consists in the employment or use of a series of wire prongs attached to a sheet-metal cylinder, which is secured to a proper handle or staff and provided with a conductor to convey the plucked fruit to the operator, all being arranged, as hereinafter described, to effect the desired end.

To enable those skilled in the art to fully understand and construct my invention, I will proceed to describe it.

A represents a staff or handle, which may be constructed of wood and of any suitable length. This handle or staff has its upper end fitted in a socket, $a$, which is attached to a sheet-metal cylinder, B, of sufficient diameter to admit of the fruit which is to be plucked to pass freely through it. The cylinder B has a series of wire prongs, C, attached to it. These prongs are formed by bending a wire into V-shaped projections, as shown in Fig. 1, the upper ends of the prongs being rounded, so as to form no sharp points or angles, the lower parts of the prongs, at their junction with each other, being secured to the cylinder B by solder or any proper means. The lower parts of the prongs C, at their junction with each other, form acute angles $b$, as shown in Fig. 1. The cylinder B is swaged so as to form ledges or projections $c$ all around it at the inner side. These ledges or projections serve as a rest or bearing for a wire rim, $d$, which is at the end of a fruit-conductor, D, said conductor being simply a tube of cloth which extends along the staff or handle, and is secured to the latter by rings $e$ at suitable distances apart. The rim $d$ is secured by a hem to the conductor, and said rim, in consequence of resting on the ledges $c$, serves as a means to attach the conductor to the cylinder B, and admits of the conductor being readily detached from the cylinder when required.

The implement is used by so manipulating it that the stem of the fruit will be wedged in any of the angles $b$, as shown in red in Fig. 2, and then suddenly twisting the implement so as to break off the fruit. The fruit, as soon as plucked, passes through the cylinder B and down through the conductor D. The operator may hold with one hand the lower end of the conductor D in a closed state until several pieces of fruit are lodged therein and then deposit them into the proper receptacle.

This device may be very cheaply constructed and easily operated. The prongs C, in consequence of being rounded at their ends, are prevented from piercing the fruit.

I do not claim broadly the conductor D, for that has been previously used; but

I do claim as new and desire to secure by Letters Patent—

The combination of the cylinder B, provided with the prongs C, staff or handle A, and conductor D, constructed and arranged as and for the purpose set forth.

NORMAN H. BRUCE.

Witnesses:
A. J. CLOUGH,
GEORGE W. GRAVES.